United States Patent [19]

Garuglieri

[11] Patent Number: 5,896,798
[45] Date of Patent: Apr. 27, 1999

[54] CHOP/SLIDE SAW

[76] Inventor: Andrea Garuglieri, Via Eritrea 7, Fraz Ravellino, 22050 Colle Brianza (Como), Italy

[21] Appl. No.: 08/769,284

[22] Filed: Dec. 18, 1996

[30] Foreign Application Priority Data

Dec. 22, 1995 [GB] United Kingdom ............... 9526374

[51] Int. Cl.⁶ .................................................. B27B 5/20
[52] U.S. Cl. ........................ 83/477.1; 83/483; 83/485; 83/581; 83/477.2
[58] Field of Search ................ 83/397, 478, 483, 83/485, 488, 489, 490, 581, 544, 477.1, 477.2

[56] References Cited

U.S. PATENT DOCUMENTS

| | | | |
|---|---|---|---|
| 3,296,914 | 1/1967 | Shallenberg | 83/488 |
| 4,318,324 | 3/1982 | Hall et al. | 83/397 |
| 4,343,213 | 8/1982 | Drixler | 83/397 |
| 4,581,966 | 4/1986 | Kaiser et al. | 83/397 |
| 4,614,140 | 9/1986 | Macksoud | 83/397 |
| 4,774,866 | 10/1988 | Dehari et al. | 83/397 |
| 4,799,416 | 1/1989 | Kumasaka et al. | 83/397 |
| 4,875,398 | 10/1989 | Taylor et al. | 83/397 |
| 5,020,406 | 6/1991 | Sasaki et al. | 83/397 |
| 5,054,352 | 10/1991 | Fushiya et al. | 83/490 |
| 5,421,228 | 6/1995 | Masatoshi . | |
| 5,513,548 | 5/1996 | Garuglieri | 83/397 |
| 5,638,731 | 6/1997 | Garuglieri | 83/397 |

FOREIGN PATENT DOCUMENTS

| | | |
|---|---|---|
| 0133166 | 3/1985 | European Pat. Off. . |
| 0586172 | 3/1994 | European Pat. Off. . |
| 3923470 | 1/1991 | Germany . |

*Primary Examiner*—M. Rachuba
*Attorney, Agent, or Firm*—Adan Ayala

[57] ABSTRACT

A saw comprising a table, a support mounted on the table, a saw assembly including a blade journalled in the assembly and a motor to drive the blade, and a slot in the table through which the blade can be plunged, wherein the support defines a channel which receives a shaft carried by the saw assembly such that the saw assembly can slide relative to and over the support to extend the reach of the saw blade along the slot. By allowing the saw assembly to lie above the support, the weight of the saw assembly is transferred to the table through the support and the space occupied by the saw assembly and support can be reduced.

19 Claims, 9 Drawing Sheets

CHOP/SLIDE SAW

BACKGROUND OF THE INVENTION

This invention relates to saws, and in particular to circular saws of the type comprising a table, a pivot member on the table and a saw assembly pivoted about a pivot axis with respect to the pivot member, whereby said saw assembly carrying a motor driven blade can be plunged into a workpiece supported on the table.

Such saws are known and described in published patent documents such as EP-0133666 and EP-0450400. These saws are useful and have numerous possibilities for enhancement to improve the capacity, capability and efficiency not to mention cleanliness and safety of their arrangements. On the other hand, all these features add complexity and cost, and may render the saw user unfriendly.

The present invention particularly, although not exclusively, relates to saws of the type described above but which in addition have the table mounted in a frame such that the table may be inverted, as by pivoting about an axis, so that the saw assembly is then beneath the table. The table is in addition provided with a slot so that the blade can protrude through the slot to render the saw a bench or table saw. Such saws are known and described in DE-1628992, EP-0502350 and EP-0586172.

Both EP-0133666 and EP-0450400 mentioned above describe saws in which the saw assembly comprises an upper guard and a lower guard for the blade. The upper guard is formed from the housing of the assembly and permanently covers a top part of the blade. A bottom part of the blade is covered by the lower guard but this must be withdrawn in use so that the blade is exposed when required to perform cutting operations.

A handle is disposed on the upper guard by means of which a user can pivot the saw assembly up and down to perform cutting operations on a workpiece supported on the table. Further, if the table has a rotational portion carrying the saw assembly, mitre cuts can also be made in a workpiece on the table.

The lower guard may be opened entirely by an actuating lever disposed on the handle. Alternatively the guard may be opened automatically by pivoting of the saw assembly, there being provided a connection between the guard and the pivot member for this purpose. A further alternative is that the guard may be opened partly by either of these arrangements and only further opened by direct contact with a workpiece.

Means must be provided to bias the saw assembly to a raised upright position when it is at rest so that the user is not required to lift the not-insignificant weight of the saw assembly after completing a plunge cut. Such means is normally in the form of a powerful spring.

Although the upper and lower guards mentioned above provide satisfactory protection for the saw blade when the saw assembly is acting as a plunge or mitre saw, when the table is flipped-over to convert the saw into a bench saw the saw blade is once again exposed. In this configuration, a separate guard must be provided which, in the past, has been mounted on a riving knife of the bench saw each time the saw is used as a bench saw.

It is also known from U.S. Pat. No. 5,060,548 to mount the saw assembly on a rod which can slide through a support mounted on the table. The pivot which carries the motor and saw blade is positioned at one end of the rod and the pivot bracket limits the motion of the rod through the support. Furthermore, all the weight of the motor and saw blade acts on one side of the support, thereby requiring the support to have significant strength.

SUMMARY OF THE INVENTION

In the light of the prior art mentioned above, the applicant has invented an improved saw which has advantages over the prior art.

According to the present invention, there is provided a saw comprising a table, a support mounted on the table, a saw assembly, the saw assembly including a blade journalled in the assembly and a motor to drive the blade, and a slot in the table through which the blade can be plunged, wherein the support defines a channel which receives a shaft carried by the saw assembly such that the saw assembly can slide relative to and over the support to extend the reach of the saw blade along the slot. By allowing the saw assembly to travel above the support, the weight of the saw assembly is transferred to the table more vertically through the support so that twisting forces on the support are reduced. Further, the space taken up by the saw assembly and support is reduced.

Preferably the support defines two parallel channels and two corresponding shafts are carried below the saw assembly for sliding along the channels. Improved support for the saw assembly is thereby provided.

Each channel is preferably C-shaped in cross-section. The shafts are preferably shaped to conform to the cross-section of the channels. It will, of course, be appreciated that the shafts (or rods) need only to be shaped to be retained within the channels and do not have to be shaped to conform to the cross-sections of the channels.

Each channel preferably includes a bearing between the support and the shaft. A low friction material, such as PTFE, may be used to reduce the friction between the shafts and the channels.

In a preferred embodiment, the saw assembly includes a detent for holding the assembly in a retracted position on the support until the saw blade is plunged towards the slot. This detent preferably automatically re-engages when the saw assembly returns to its start position.

Preferably the support includes a pivot block fixed to the table and a pivot member which defines the or each channel, the pivot member being pivotable relative to the pivot block to adjust the angle of cut of the saw blade so that bevel cuts can be made.

A retraction mechanism may act between the pivot block and the pivot member to urge the saw blade into a preferred position, which may be substantially perpendicular to the slot.

The saw assembly may include a quadrilateral linkage which, as the saw blade is plunged towards the slot, opens a blade guard to expose the saw blade.

The saw assembly preferably further comprises a motor plate which carries each shaft, and spring means between the motor plate and the motor which act to raise the blade away from the slot. By including such spring means, a user of the saw does not have to raise the not-insignificant weight of the saw assembly at the end of a cut.

The spring means preferably comprise a spring and a lever which, when rotated, releases the tension in the spring to lower the saw blade. This is important if the saw is to be used as a table saw rather than as a plunge (or chop) saw.

Preferably the motor plate carries a locking device for locking the lever to prevent movement of the saw blade.

The spring means may further comprise a worm drive which, when the lever is rotated, is brought into engagement with a rack mounted on the motor, such that the worm drive can be used to control the position of the saw blade relative to the slot.

If the saw assembly includes a quadrilateral linkage, the rack is preferably formed on an extension of the linkage.

Preferably means are provided for locking the saw assembly at any position relative to the support. A toggle lever carried by the saw assembly may be used to lock the saw assembly position.

As will be appreciated, although the present invention is particularly applicable to chop saws, it may also be applied to saws which can act as both a chop saw and a table saw. In such a case, the table is preferably mounted in a frame and adapted to adopt two positions. In the first of said two positions of the table the saw assembly is above the table, the saw thereby forming a chop saw for performing plunge cuts on workpieces supported on a first side of the table. In the second of said two positions of the table, the saw assembly is below the table and the saw thereby forms a bench saw for performing cuts on workpieces passing through the blade on a second opposite side of the table.

DESCRIPTION OF THE DRAWINGS

Specific embodiments of the present invention are now described, by way of example only, with reference to the accompanying drawings, in which.

DETAILED DESCRIPTION

Figure 1:
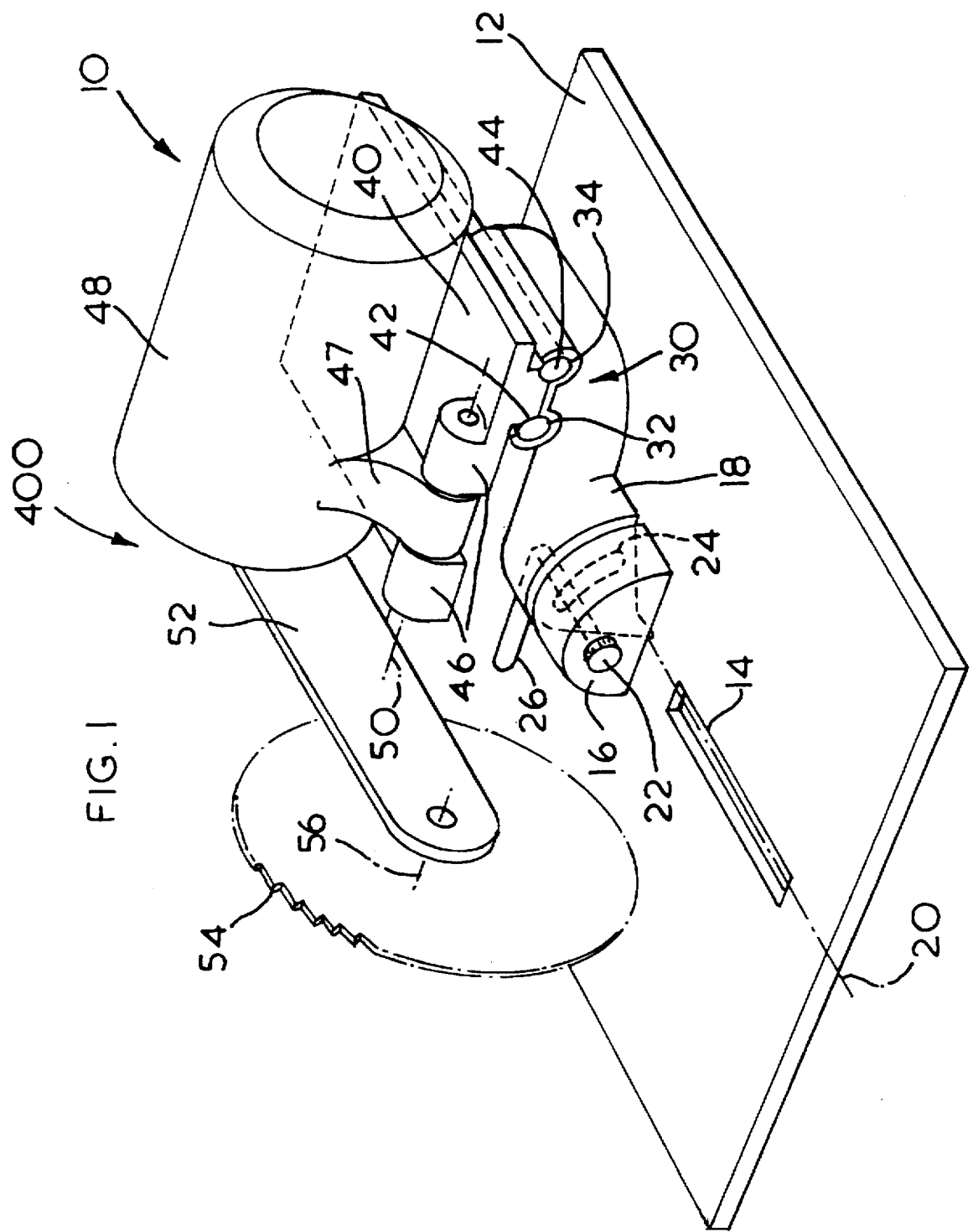
FIG. 1 is a perspective sketch of a saw according to the present invention.

A saw 10 comprises a table 12 having a slot 14 and a pivot block 16 rigidly fixed to the table. A pivot member 18 is pivotably attached to the pivot block 16 about an axis 20 lying in the plane of the table 12 and passing along the slot 14. A bolt 22 received in the pivot block 16 passes through an arcuate slot 24 in the pivot member 18 and terminates with a lever 26 by means of which the bolt 22 may be tightened to secure the pivot member 18 in any angular position between two limits.

Figure 2:
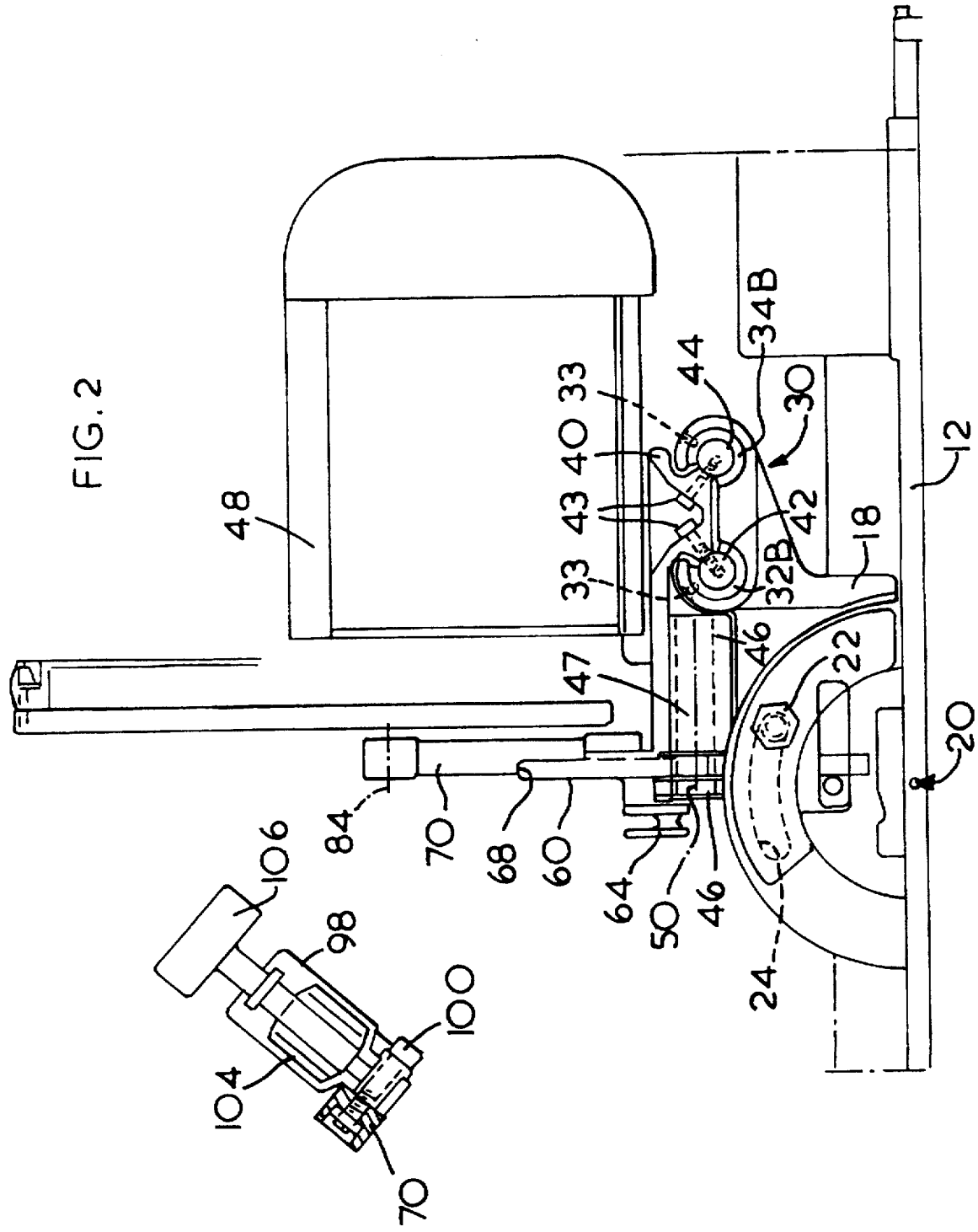
FIG. 2 is a more detailed front view of a saw according to the present invention.

The pivot member 18 also comprises a bearing cage 30 having two parallel C-shaped bearing channels 32, 34 including C-shaped bearings 32B, 34B (shown in FIG. 2). A motor plate 40 has two bars 42, 44 rigidly fixed thereto. The bars 42, 44 are received in the channels 32, 34 respectively. The plate 40 can therefore slide back and forth relative to the pivot member 18. The bars 42, 44 and channels 32, 34 are arranged so that the direction of slide is always parallel to the axis 20 (and slot 14).

Since the channels 32, 34 are open in section and the connection to the bars 42, 44 is through the open channel, the length of the bars 42, 44 can be minimised for the given travel of the saw assembly 400 (which includes motor 48 and saw blade 54) and the mechanical support requirements of the saw assembly 400 through the bearings 32B, 34B. This is further enhanced by the weight distribution of the saw assembly 400 and motor plate 40 through the bearings 32B, 34B. Despite not having a full circumference, bearings 32B, 34B can be small because there are less torsional stresses on them about an axis parallel axis 50. This is important given the desire to minimise the bulk of the final saw and the working room required for its satisfactory operation. This is particularly the case where the saw is a pivoting saw where the table 12 is arranged to pivot within a frame 300. The frame 300 should be kept to a minimum in size for easier transportation and reduced working room requirements. The present arrangement facilitates that end by minimising the intrusion of the slide system within the overall volume envelope of the saw.

Hinge parts 46 are formed at the front of the plate 40. A motor 48 has another hinge part 47 which is joined to hinge parts 46 through an axle which enables pivoting of the motor 48 relative to the plate 40 about an axis 50. The motor 48 is fixed to a blade assembly 52 which includes a saw blade 54 driven by the motor 48.

The axis 56 of the blade 54 is parallel to the axis (not shown) of the motor 48 and axis 50. The blade 54 is arranged above the slot 14 so that pivoting of the motor 48 about axis 50 plunges the blade 54 into the slot 14, at whatever angle the pivot member 18 is with respect to the pivot block 16. Moreover the slot 14 is long enough to accommodate full movement of the plate 40 back and forth with respect to the pivot member 18, even with the blade 54 plunged fully downwards.

Turning to FIG. 2, the plate 40 is carried by the bearing cage 30. The bearings 32B, 34B are retained by set screws 33. The bars 42, 44 are secured to the plate 40 by screws 43, staggered with respect to one another along the length of the bars 42, 44.

Figure 3:
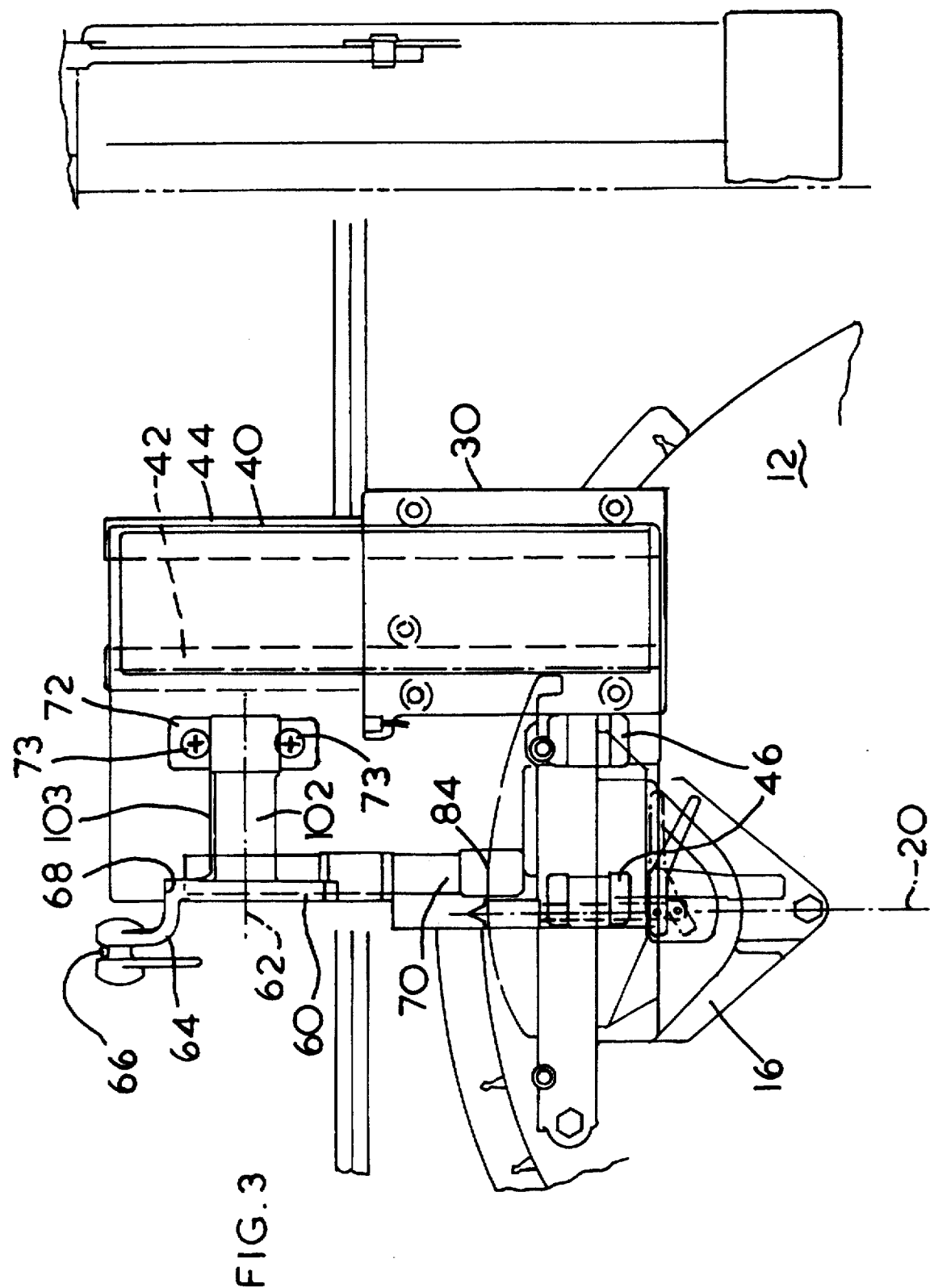
FIG. 3 is a top plan view.

FIG. 3 shows the extent of the plate 40 and the cage 30. Also, at the back of plate 40 is mounted spring release lever 60, which is mounted for rotation about axis 62 in the plate 40. An eccentric catch element 64 retains one end of a tension spring 66. The lever 60 is received firstly in a large aperture 68 in an arm 70 upstanding from the plate 40, and secondly in a bracket 72 fixed to the plate 40 by screws 73.

Figure 4:
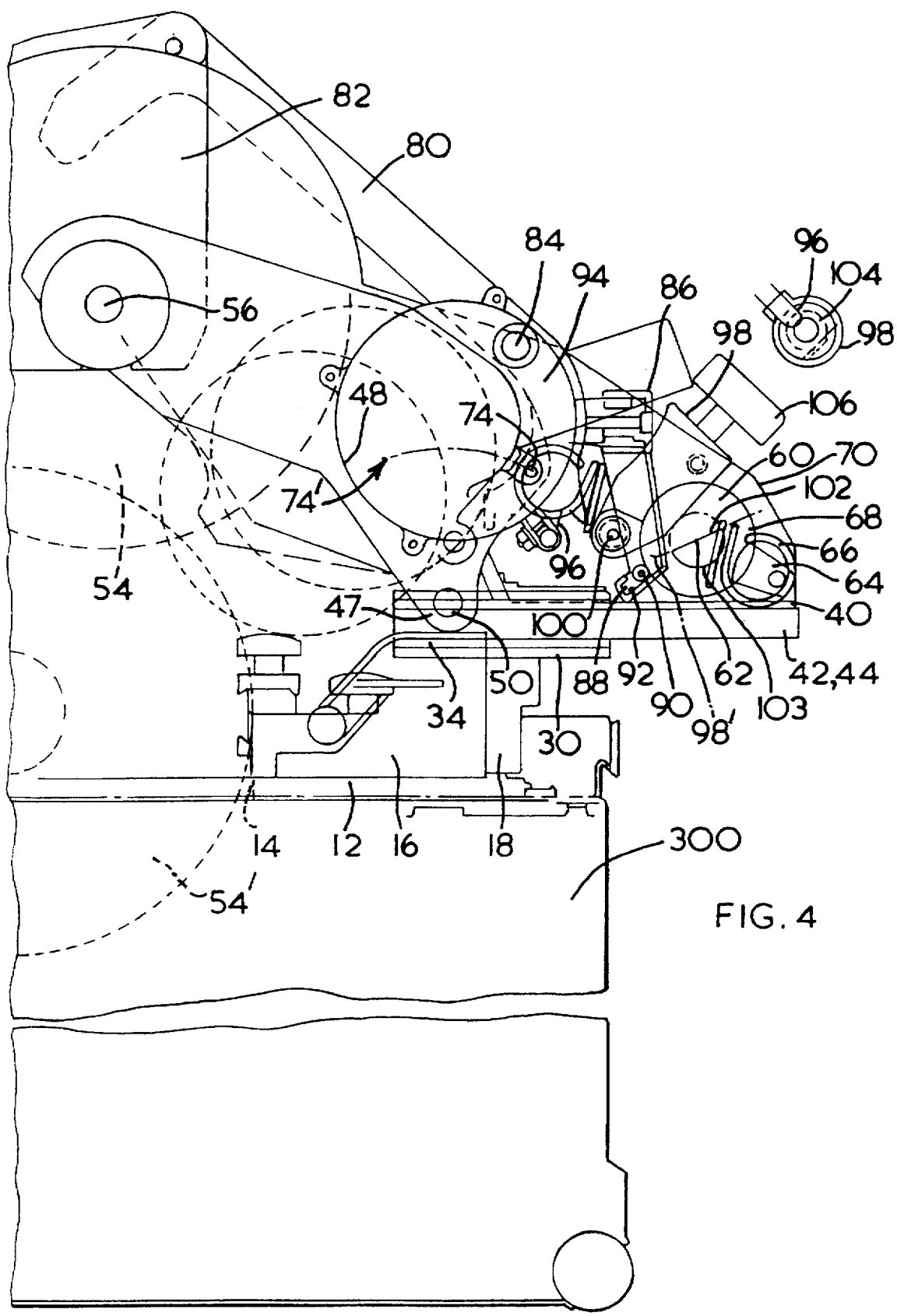
FIG. 4 is a side view.
Figure 7:
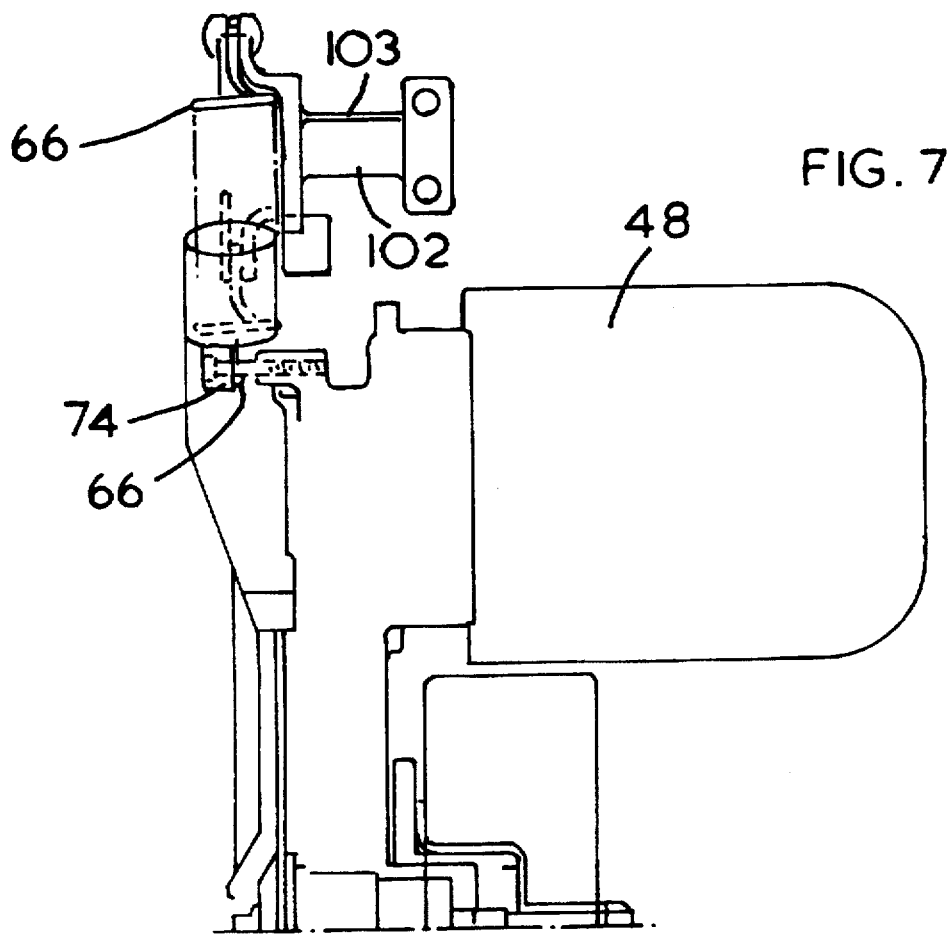
FIG. 7 is yet another plan view showing different details.

Turning to FIG. 4, the spring 66 acts between the element 64 on the lever 60 and a catch 74 on the side of the motor 48 at its front end (see also FIG. 7). Thus, pivoting of the motor 48 about axis 50 (to plunge the blade 54 into slot 14) extends and tensions the spring 66, which is of course strong enough to lift the motor 48 and saw assembly 400 when released by the user from a plunged position.

Blade assembly 52 includes a parallelogram lever 80 which at the top end is pivoted to an upper blade guard 82 which is also pivoted about the blade axis 56. The lever 80 is pivoted At its lower end to the upstanding arm 70 about axis 84. An extension 200 at the top end of the lever 80 prevents the blade assembly 52 from being plunged down unless switch lever 202 is pulled. Switch 202 is mounted on handle 204 fixed to the upper blade guard 82. Lever 202, when first pulled, rotates lower blade guard 206 a small amount so that a cam 208 on the lower blade guard 206 is released from blocking engagement with extension 200. Thereafter, further opening of the lower blade guard 206 is accomplished by action of the extension 200 on the front face of cam 208. A spring (not shown) biasses the lower blade guard 206 to its covering position with respect to the blade 54. When the assembly 52 is permitted to pivot down, however, the parallelogram lever 80 maintains the disposition of the upper guard 82 with respect to the table 12.

Pivoting down of the motor 48 and blade assembly 52 releases a detent 86 connected to the back of the motor 48 and which otherwise catches, at its lower end 88, against the back of the bearing cage 30 and prevents the plate 40 from sliding along the cage 30. The lower end 88 is pivoted to the detent 86 at 90 so that, when the blade assembly 52, motor 48 and plate 40 are slid forwardly to a front position (not shown) and the blade assembly 52 is permitted to rise under the action of the spring 66, the detent 86 does not prevent such raising. On such raising of the blade assembly 52, the catch 88 is merely deflected by contact with the top of the cage 30 about axis 90 until the plate 40 is slid back to the position shown in FIG. 4, whereupon catch 88 snaps off the cage 30 under the action of a spring 92.

An extension 94 at the lower end of the lever 80 has a rack 96 formed thereon. Also, a worm assembly 98 is pivoted about axis 100 to the upstanding arm 70 (see also inset to FIG. 2). When the spring release lever 60 is in the position shown in the drawings, a flat surface 102 between its ends (see also FIGS. 3 and 7) faces the back of worm assembly 98 so that the worm assembly 98 lies with its back at the position shown at 98'. Here, the worm assembly 98 is not contacted by the rack 96 when the assembly 52 is pivoted down, and the rack 96 and worm assembly 98 have no function. However, when the table 12 is inverted (by means not shown) to convert the saw 10 to a bench saw and where the blade 54' protrudes right through the slot 14, the rack 96 and worm assembly 98 come into operation. The spring release lever 60 is turned, anti-clockwise in FIG. 4. This first releases the tension in the spring 66. Secondly, curved surface 103 of the lever 60 presses the back of the worm assembly 98 so that it eventually adopts the position shown in FIG. 4, and this brings worm 104 (see inset to FIG. 2) in the assembly 98 into engagement with the rack 96. A knob 106 enables a user to rotate worm 104 which then alters the position of parallelogram lever 80 and hence the degree of protrusion of the blade 54 through the slot 14.

Figure 5:
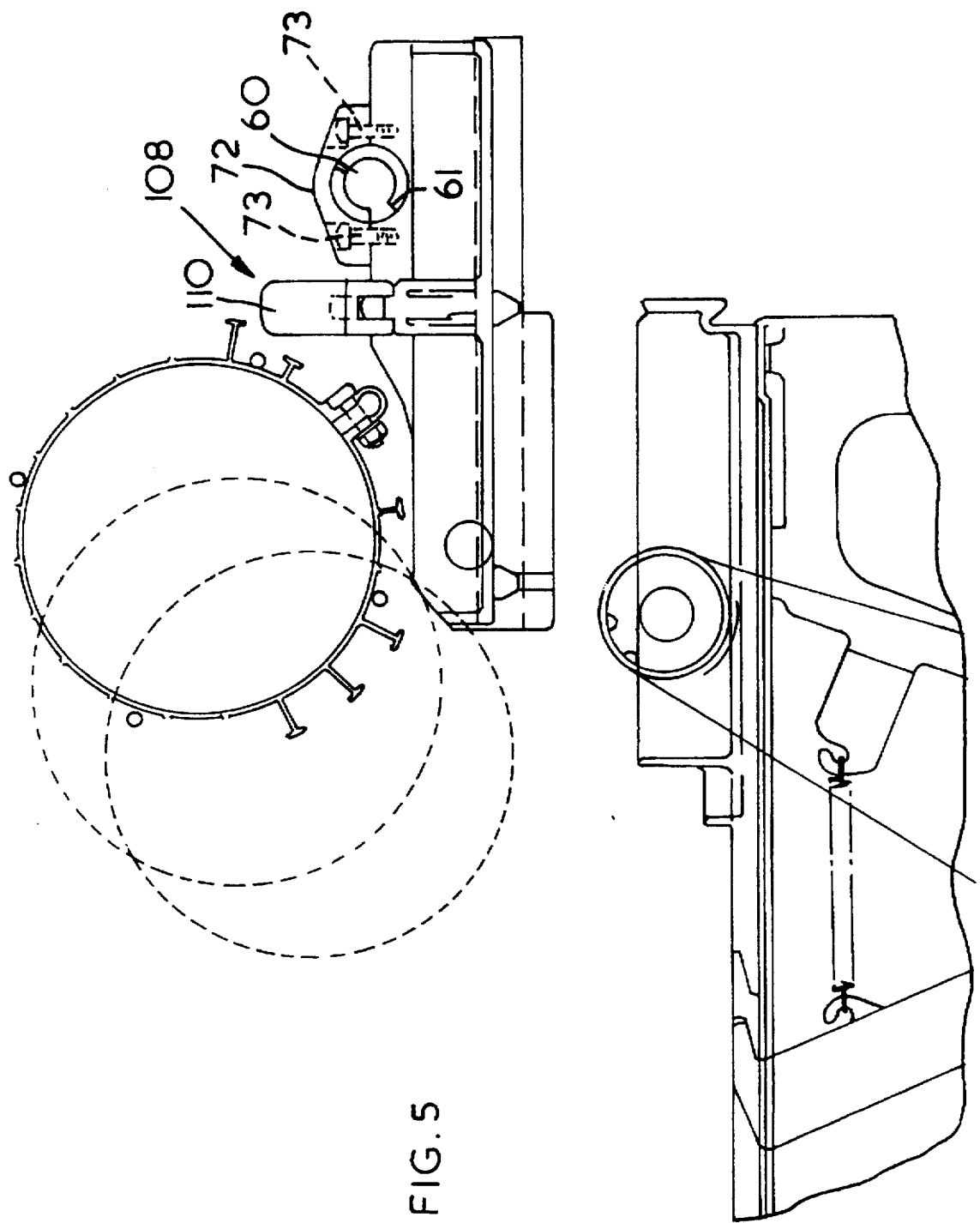
FIG. 5 is another side view showing different details.

Turning to FIG. 5, a key 61 on the end of the spring release lever 60 limits the rotation of the lever 60 between two positions, and, at least in the position shown in FIG. 4, locks lever 60 in that position, in the sense that the spring 66 pressure presses the key 61 against its stop.

Figure 8:
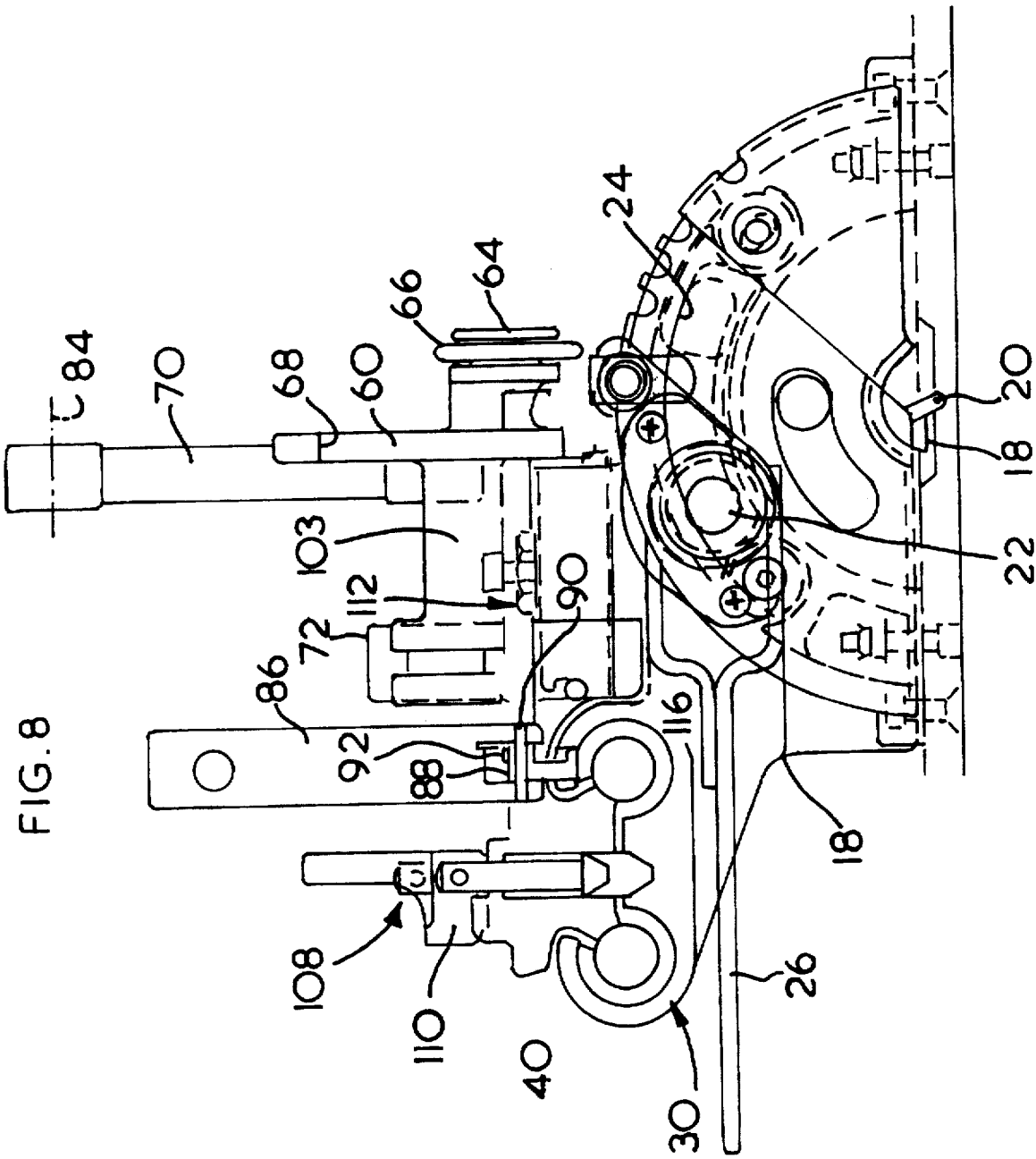
FIG. 8 is a rear view (the mirror of FIG. 2)
Figure 9:
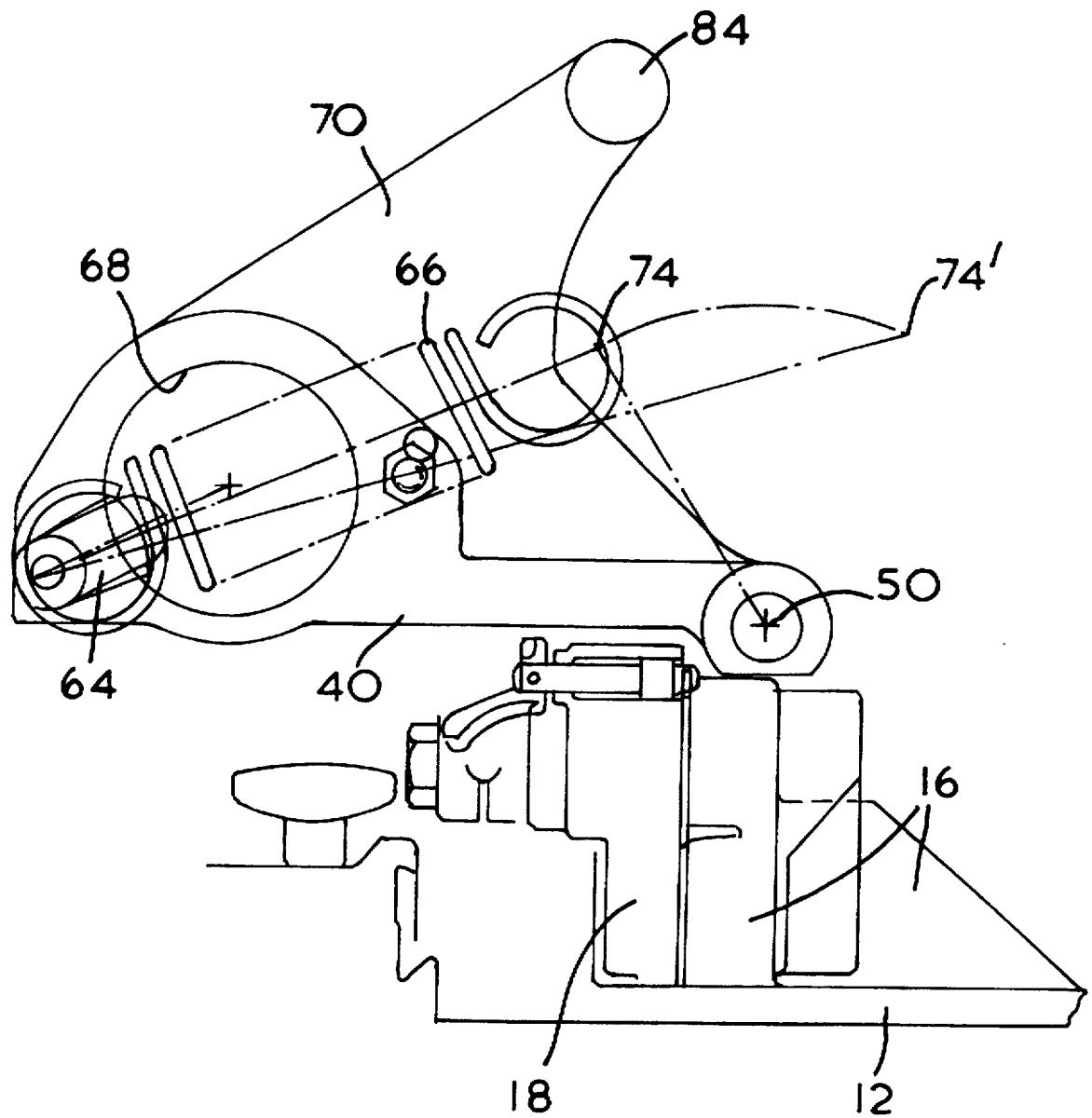
FIG. 9 is a side view from the other side with respect to FIGS. 4 and 5.
Figure 10:
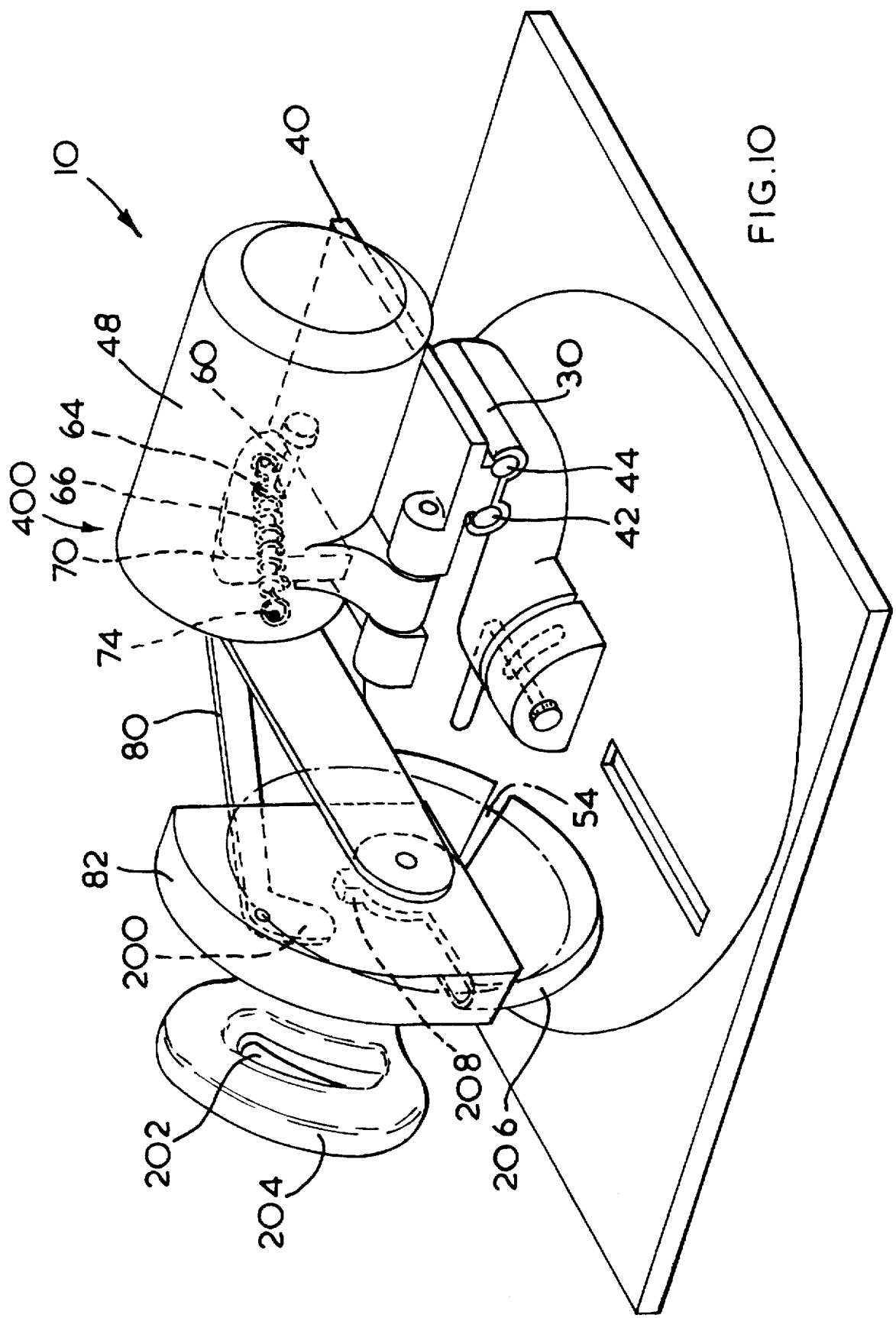
FIG. 10 is a view like FIG. 1, but with the guards and levers shown in schematic.

Also in FIG. 5 is a lock 108, which can be employed to lock the plate 40 in position at one end of the cage 30. The lock 108 has a toggle lever 110 by means of which the lock 108 may be permanently disengaged (see also FIG. 8).

Figure 6:
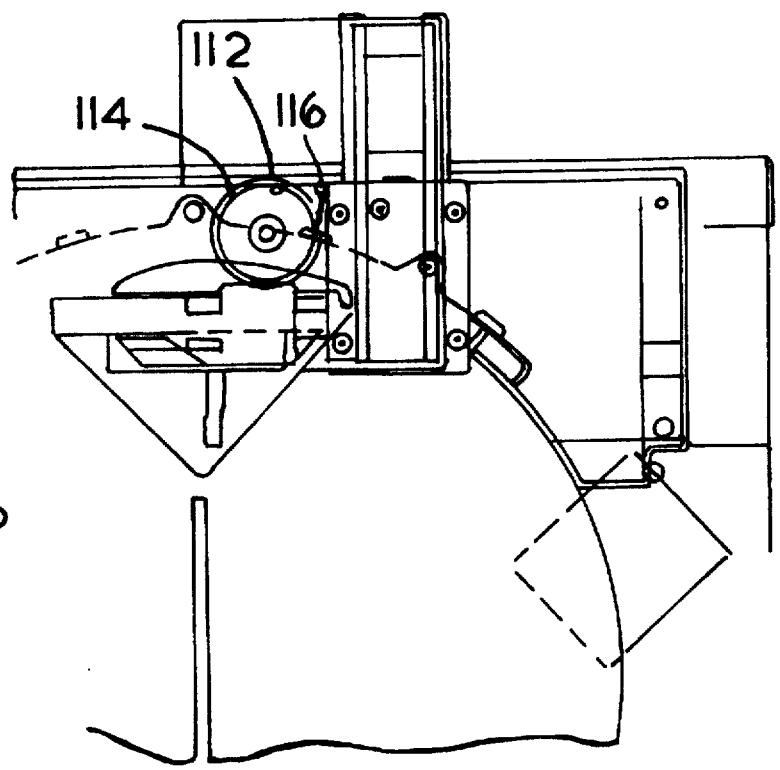
FIG. 6 is another plan view showing different details.

FIG. 6 shows a retraction mechanism 112 fixed to the plate 40 which has a spring loaded cable 114, one end 116 of which is connected to the cage 30. This serves to bias the blade assembly 52 and plate 40 back to the position shown in FIG. 4.

It will of course be understood that the present invention has been described above purely by way of example, and that modifications of detail can be made within the scope of the invention.

I claim:

1. A saw comprising:

a table;

a support fixedly mounted on the table and defining at least one channel, the support comprising a pivot block fixed to the table and a pivot member which defines the at least one channel, the pivot member being pivotable relative to the pivot block to adjust blade cutting angle;

a saw assembly comprising a blade journalled in the saw assembly, a motor to drive the blade, and at least one shaft slideably mounted on the at least one channel; and a slot in the table through which the blade can be plunged, wherein the saw assembly can slide relative to and over the support to extend the reach of the saw blade along the slot.

2. A saw as claimed in claim 1, wherein the at least one channel has a C-shaped cross-section.

3. A saw as claimed in claim 1, wherein the at least one channel comprises a bearing between the support and the shaft.

4. A saw as claimed in claim 1, wherein the saw assembly further comprises a detent for holding the saw assembly in a retracted position on the support until the saw blade is plunged towards the slot.

5. A saw comprising:

a table;

a support mounted on the table and defining a first channel, the support comprising a pivot block fixed to the table and a pivot member which defines the first channel, the pivot member being pivotable relative to the pivot block to adjust blade cutting angle;

a saw assembly comprising a blade journalled in the saw assembly, a motor to drive the blade, and a first shaft slideably mounted on the first channel; and a slot in the table through which the blade can be plunged, wherein the saw assembly can slide relative to and over the support to extend the reach of the saw blade along the slot.

6. A saw as claimed in claim 5, wherein a retraction mechanism acts between the pivot block and the pivot member to urge the saw blade into a position substantially perpendicular to the slot.

7. A saw as claimed in claim 5, wherein the saw assembly further comprises a quadrilateral linkage engaged to the blade guard and the saw assembly so that, as the saw blade is plunged towards the slot, the blade guard is opened to expose the saw blade.

8. A saw as claimed in claim 7, wherein the saw assembly further comprises a motor plate which carries the shaft and a spring means between the motor plate and the motor for biasing the blade away from the slot.

9. A saw as claimed in claim 5 wherein the saw assembly further comprises a motor plate which carries the shaft and a spring means between the motor plate and the motor for biasing the blade away from the slot.

10. A saw as claimed in claim 9, wherein the spring means comprise a spring and a lever which, when rotated, releases the tension in the spring to lower the saw blade.

11. A saw as claimed in claim 10, wherein the motor plate carries a locking device for locking the lever.

12. A saw as claimed in claim 5, further comprising means for locking the saw assembly at any position relative to the support.

13. A saw as claimed in claim 1, wherein the at least one shaft is carried below the saw assembly.

14. A saw as claimed in claim 1, wherein the at least one shaft bears a substantial portion of weight of the saw assembly substantially evenly over length of the at least one shaft.

15. A saw as claimed in claim 5, wherein the first channel has a C-shaped cross-section.

16. A saw as claimed in claim 5, wherein the first channel comprises a bearing between the support and the shaft.

17. A saw as claimed in claim 5, wherein the saw assembly further comprises a detent for holding the saw assembly in a retracted position on the support until the saw blade is plunged towards the slot.

18. A saw as claimed in claim 5, wherein the shaft bears a substantial portion of weight of the saw assembly substantially evenly over length of the at least one shaft.

19. A saw as claimed in claim 12, wherein said locking means comprises a toggle lever carried by the saw assembly.

* * * * *